United States Patent
Irwan et al.

(10) Patent No.: US 10,951,605 B2
(45) Date of Patent: Mar. 16, 2021

(54) CENTRALLY MANAGING DATA FOR DISTRIBUTED IDENTITY-BASED FIREWALLING

(71) Applicant: Xage Security, Inc., Palo Alto, CA (US)

(72) Inventors: Susanto Junaidi Irwan, San Francisco, CA (US); Roman M. Arutyunov, San Jose, CA (US); Andy Sugiarto, Moraga, CA (US); Ganesh B. Jampani, Gilroy, CA (US)

(73) Assignee: Xage Security, Inc., Palo Alto, CA (US)

( * ) Notice: Subject to any disclaimer, the term of this patent is extended or adjusted under 35 U.S.C. 154(b) by 218 days.

(21) Appl. No.: 16/280,926

(22) Filed: Feb. 20, 2019

(65) Prior Publication Data

US 2020/0267138 A1     Aug. 20, 2020

(51) Int. Cl.
*H04L 29/06* (2006.01)
*H04L 29/08* (2006.01)
*H04L 12/927* (2013.01)

(52) U.S. Cl.
CPC ........ *H04L 63/0815* (2013.01); *H04L 47/808* (2013.01); *H04L 63/0263* (2013.01); *H04L 63/0876* (2013.01); *H04L 67/2809* (2013.01)

(58) Field of Classification Search
CPC .................................................. H04L 63/0815
USPC ............................................................ 709/8
See application file for complete search history.

(56) References Cited

U.S. PATENT DOCUMENTS

| | | | |
|---|---|---|---|
| 8,266,327 B2 | 9/2012 | Kumar et al. | |
| 9,531,716 B1* | 12/2016 | Monclus | H04L 63/10 |
| 2004/0054690 A1* | 3/2004 | Hillerbrand | H04L 67/2819 |
| 2006/0075478 A1* | 4/2006 | Hyndman | H04L 63/0227 726/11 |
| 2012/0011567 A1* | 1/2012 | Cronk | H04N 21/4753 726/4 |
| 2012/0216244 A1* | 8/2012 | Kumar | G06F 21/57 726/1 |
| 2014/0280961 A1* | 9/2014 | Martinez | H04L 41/5054 709/226 |
| 2016/0156661 A1* | 6/2016 | Nagaratnam | G06F 21/57 726/1 |
| 2018/0343236 A1* | 11/2018 | Pillay-Esnault | H04L 63/0236 |

OTHER PUBLICATIONS

Collins, "posting", 2020 (Year: 2020).*

(Continued)

*Primary Examiner* — Ondrej C Vostal
(74) *Attorney, Agent, or Firm* — Hickman Becker Bingham Ledesma LLP

(57) ABSTRACT

In an embodiment, a computer-implemented method comprises receiving, by at least one broker computing devices, identity awareness data from a plurality of directory services in a federation; posting, by the at least one broker computing device, the identity awareness data to a distributed data repository; establishing, at a networking hardware device having a first type, firewall rules using the identity awareness data from the distributed data repository; controlling, by the networking hardware device having the first type, network traffic based on the identity awareness data.

20 Claims, 6 Drawing Sheets

(56) References Cited

OTHER PUBLICATIONS

Sage Publishing, "Posting to an Institutional Repository (Green Open Access)", 2020 (Year: 2020).*
Wason et al., "Liberty ID-FF Architecture Overview", Version 1.2-errata-v1.0, 2005 (Year: 2005).*
The International Searching Authority, "Search Report" in applicatio No. PCT/US20/18056, dated Apr. 22, 2020, 14 pages.

* cited by examiner

CENTRALLY MANAGING DATA FOR DISTRIBUTED IDENTITY-BASED FIREWALLING

TECHNICAL FIELD

One technical field of the present disclosure relates to methods, systems, computer software, and/or computer hardware in the field of network communications. Another technical field is computer-implement methods and systems for providing network access control services to prevent unauthorized traffic. Another technical field is controlling network access to internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured effectively, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

In some security approaches, a firewall accesses mappings from different directory agents to control network access to devices by using users' identities. A directory agent includes IP-to-user mappings. This traditional approach requires that the firewall have connectivity to the directory agents for accessing the IP-to-user mappings. This traditional approach creates difficulties for distributed firewalls that continuously need the latest mappings, where connectivity to the directory agents may not be reliable enough to obtain the latest mappings or where responsiveness of one or more directory agents is not guaranteed. This traditional approach also creates difficulties for an enterprise with numerous firewalls, where each needs to be provided with the latest mappings or when new firewalls need to be deployed.

Thus, there is a need for an access control authority that securely enables network access based on users' identities even in the absence of a directory agent.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 FUNCTIONAL OVERVIEW
3.1 BROKER
3.2 DISTRIBUTED DATA REPOSITORY OPERATIONS
3.3 IDENTITY-BASED FIREWALL
4.0 PROCEDURAL OVERVIEW
5.0 HARDWARE OVERVIEW
6.0 OTHER ASPECTS OF DISCLOSURE

1.0 General Overview

According to various embodiments, computer-implemented methods and systems are provided that enable user identities and access policies to be centrally managed and distributed across a field of firewalls. Embodiments offer the benefit of not requiring different directory agents to provide the user identities and access policies at each firewall. Distributing centrally-managed user identities and access policies across all distributed firewalls becomes efficient and can be updated quickly.

In an embodiment, a computer-implemented method comprises receiving, by at least one broker computing device, identity awareness data from a plurality of directory services in a federation; posting, by the at least one broker computing device, the identity awareness data to a distributed data repository; establishing, by a networking hardware device having a first type, firewall rules using the identity awareness data from the distributed data repository; controlling, by the networking hardware device having the first type, network traffic based on the identity awareness data. Other embodiments, aspects and features will become apparent from the remainder of the disclosure as a whole.

2.0 Structural Overview

Figure 1:
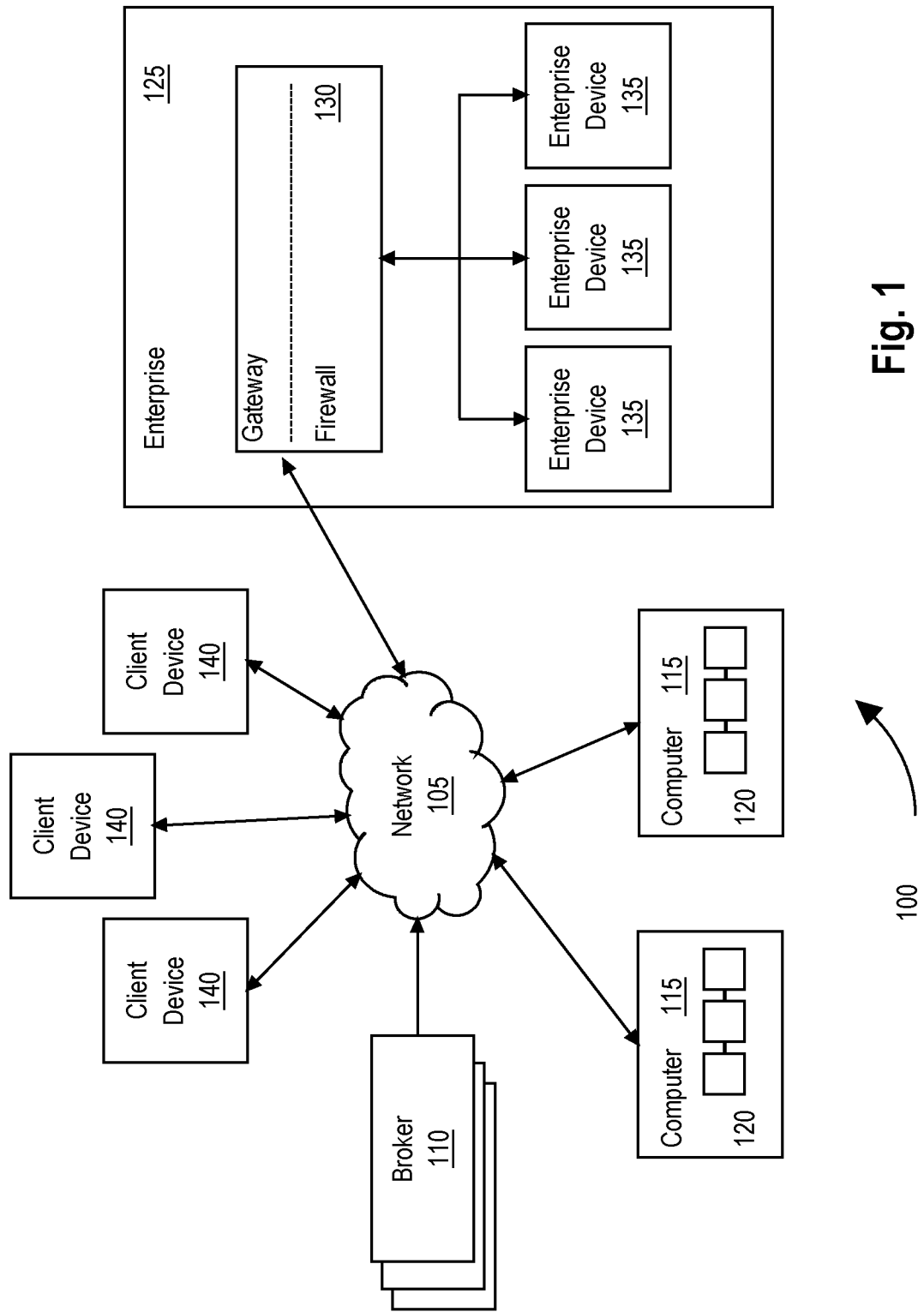
FIG. 1 illustrates an example networked computer system in accordance with some embodiments.

FIG. 1 illustrates an example networked computer system in accordance with some embodiments.

In some embodiments, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, Golang, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement.

In the example of FIG. 1, the networked computer system 100 may facilitate the secure exchange of data between programmed brokers 110, devices 115 of a distributed ledger, an identity-based firewall 130, enterprise devices 135, and client devices 140. For simplicity of illustration, client devices 140 are illustrated as being remotely located from, although client devices can instead be located within, an enterprise 125 and, furthermore, the enterprise 125 is illustrated as having a single identity-based firewall 130 although an enterprise can have numerous identity-based firewalls. In some embodiments, each of elements 110, 115, and 130 of FIG. 1 may represent one or more computers that host or execute stored programs that provide the functions and operations that are described further herein in connection with access control services and distributed ledger operations.

A broker 110 may be a computer, software and/or hardware or a combination storing instructions that are programmed or configured to access, from one or more directory services, identity awareness data, including but not limited to identities of users, applications, and/or client devices (for example, user names and/or user group names mapped to users' IP addresses, application protocols, port numbers, and/or any other application specific identity data) and their corresponding access policies. For example, user identities may specify users who have access through the identity-based firewall 130 and user access policies may control what the users can access.

A federation is a group of entities, such as directory services, agreeing upon standards of user identities and access control in a collective fashion. This allows directory services to delegate collective authority over, for example, one or more identity-based firewalls 130 within the enterprise 125. In some embodiments, the broker 110 and other brokers 110 associated with the same federation, together, may generate hashes and encrypt all identity awareness data accessed from the directory services belonging in the same federation and send the information over a network 105 to a digital distributed ledger 120 for storage, as further described herein. In this manner, all identity awareness data is centrally managed by all brokers 110 associated with the same federation.

Network 105 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 105 and the disclosure presumes that all elements of FIG. 1 are communicatively coupled via the network 105. The various elements depicted in FIG. 1 may also communicate with each other via direct communications links that are not depicted in FIG. 1 for purposes of explanation.

The distributed ledger 120 may comprise blocks of linked data that are stored in an interconnected network of computers, with suitable stored programs at those computers to support ordered creation and transmission of distributed ledger data. The distributed ledger 120 forms a distributed database that maintains a continuously growing list of ordered records, termed blocks, that are timestamped and linked to a previous block. Each block in the series of blocks is linked together chronologically, with each new block containing a hash of the previous block, such as in a blockchain. Each computer 115, or node, in a network of computers may store the entire record of linked data blocks. This creates a consensus network of computers that can verify the integrity of each block of data and the integrity of the entire distributed ledger 120. The consensus network has the benefit of having a high Byzantine fault tolerance, which is the ability of a computing system to tolerate Byzantine failures. As a result, the distributed ledger 120 functions as a distributed database that ensures the integrity of the data by utilizing hash functions to link each block to its previous block and storing the entire record of data blocks at each node.

Network access control services may be computer-implemented services that are programmatically offered by the identity-based firewall 130. The identity-based firewall 130 may be a computer, software and/or hardware or a combination storing instructions configured to access the identity awareness data stored in the distributed ledger 120, and controls network access to traffic flowing to and from a private network, such as the enterprise 125, based on the identity awareness data. For example, the identity-based firewall 130 may store a copy of the identity awareness data in a local database by periodically checking the distributed ledger 120 for updated data or that is automatically updated by the distributed ledger 120 when changes occur. The identity-based firewall 130 may use the identity awareness data to establish firewall rules, which are used to control incoming and outgoing network traffic. In some embodiments, the identity-based firewall 130 may also periodically update the distributed ledger 120 with locally stored and updated information to the identity awareness data.

In some embodiments, the identity-based firewall 130 may be a separate device or program from a gateway. A gateway may be a computer, software and/or hardware or a combination storing instructions configured to forward network traffic. In some embodiments, a gateway may be configured to access the identity awareness data stored in the distributed ledger 120 and actively manage the identity-based firewall 130. In some embodiments, the gateway may be programmed as the identity-based firewall 130 to automatically enforce network access based on the identity awareness data stored in the distributed ledger 120.

A client device 140 may be a computer, a virtual computer, and/or a computing device located within or outside (remotely from) an enterprise 125. The client device 140 may also be other IoT devices, which are physical devices with network connectivity capabilities that enables these physical devices to collect and exchange data. The client device 140 may also be specific users using a computer or IoT device. The client device 140 may also be applications running on a computer or IoT device.

An enterprise device 135 may be a computer, a virtual computer, and/or a computing device located within an enterprise 125. A computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 135 may be computer network devices such as gateways, modems, routers, wireless access points, switches, hubs, and firewalls. The enterprise device 135 may also be other IoT devices, which are physical devices with network connectivity capabilities that enables these physical devices to collect and exchange data. The enterprise device 135 may also be specific users using a computer or IoT device. The enterprise device 135 may also be applications running on a computer or IoT device. An enterprise device 135 may be located behind an identity-based firewall 130.

3.0 Functional Overview

In some embodiments, all brokers 110 associated with a federation, the distributed ledger 120, and the identity-based firewall 130 interoperate programmatically in an unconventional manner to provide an access control intermediary that continuously manages network access from the client devices 135. In some embodiment, the identity-based firewall 130 is programmed to control network access by the client devices 135 using the identity awareness data stored in the distributed ledger 120. The brokers 110, the distributed ledger 120, and the identity-based firewall 130 are programmed to or configured to copy, encrypt, distribute, store, transport, and/or monitor the identity awareness data in a secure manner so that the identity-based firewall 130 may perform network access controls using this data, as further described in other sections herein.

3.1 Broker

Figure 2:
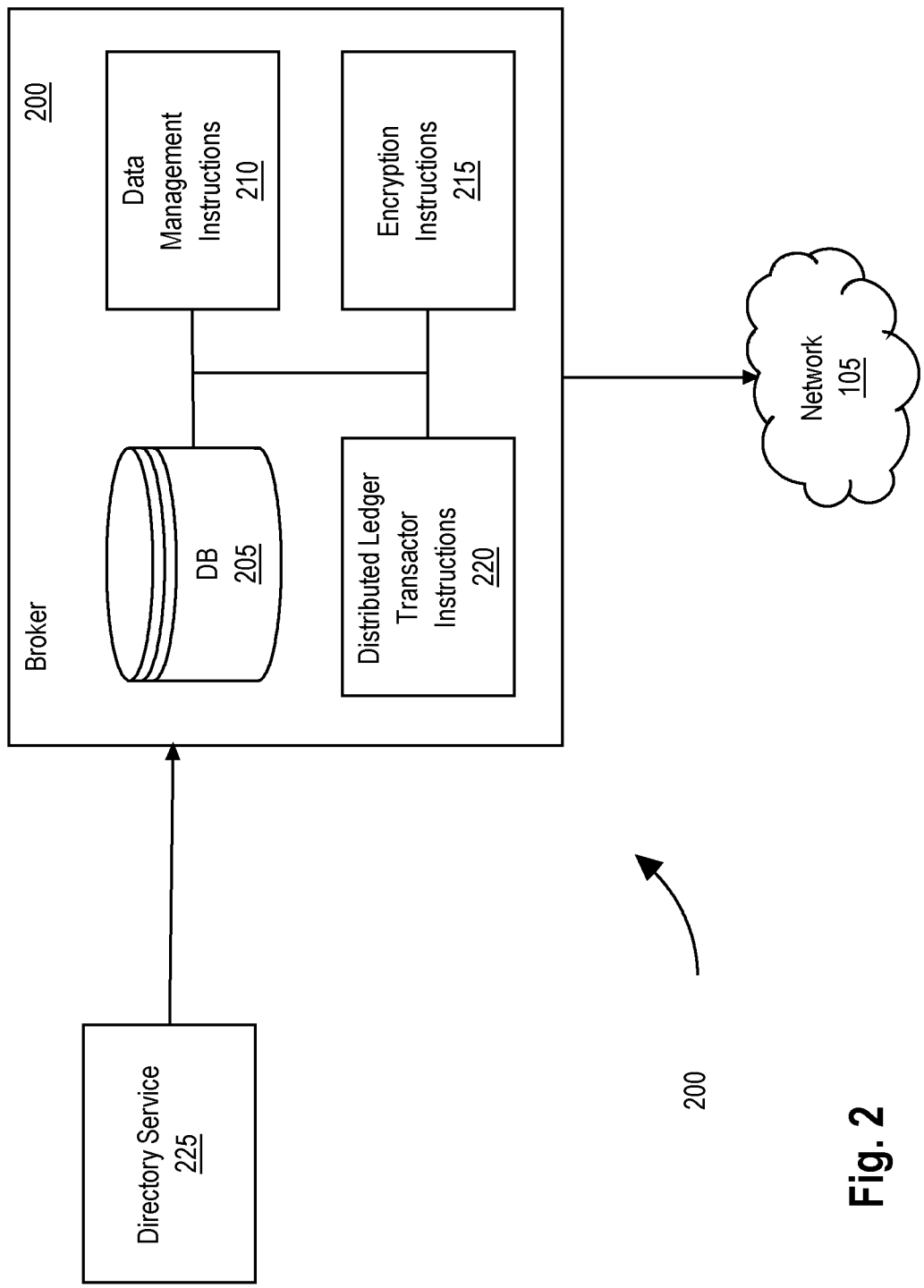
FIG. 2 illustrates an example broker in accordance with some embodiments.

FIG. 2 illustrates an example broker 200 in accordance with some embodiments. In some embodiments, the broker 110 of FIG. 1 is similarly configured as the broker 200. The broker 200 is associated with a federation. The broker 200 may use a database 205 to store the identity awareness data retrieved from one or more directory services 225 in the federation using data management instructions 210. In some embodiments, the broker 200 is a dedicated broker for a single directory service in the federation. In some embodiments, the broker 200 is one of a plurality of brokers associated with the federation.

In some embodiments, identity awareness data from all brokers associated with the federation may be encrypted by encryption instructions 215. For example, the encryption instructions 215 may apply a hash algorithm, such as an MD5, Secure Hash Algorithm (SHA) 256, or any other hash function, to the identity awareness data to generate one or more hashed or encrypted data object elements. The hash may act as a numerical representation of an object element. Any hash function, as understood in the art, may be used. Any changes to the object element would change the hash, thereby creating differences in the current hash compared to a previous hash.

The one or more encrypted object elements are then sent over the network 105 to the digital distributed ledger 120 for storage using distributed ledger transactor instructions 220. The distributed ledger transactor instructions 220 update the digital distributed ledger 120 by creating one or more new blocks or entries in the distributed ledger 120.

3.2 Distributed Ledger Operations

The distributed ledger 120 functions as a decentralized digital ledger that tracks numerous entries. Copies of the entire distributed ledger may be stored at each computer 115, or node, in a distributed network of interconnected computers of which FIG. 1 illustrates computer 115 with distributed ledger 120. In an embodiment, proposed entries to the distributed ledger 120 may be checked by a majority of the computers for verification. For example, if a new entry is generated for storage in the distributed ledger 120, the network of interconnected computers that also store copies of the distributed ledger 120 would first run algorithms to evaluate the hash value and verify the validity of the entry. If a majority of the computers agree that the entry is valid, then the entry will be added as a new block in the distributed ledger 120. As a part of a consensus network, distributed ledger 120 enforces high Byzantine fault tolerance; for example, a malicious attack attempting to alter the information in the distributed ledger 120 would need to control over 50% of the computers in the consensus network to alter the consensus. Since it would be exceedingly difficult to maliciously attack and maintain control over that many computers, the distributed ledger 120 data is better protected against malicious attacks than traditional methods of data storage.

Figure 3:
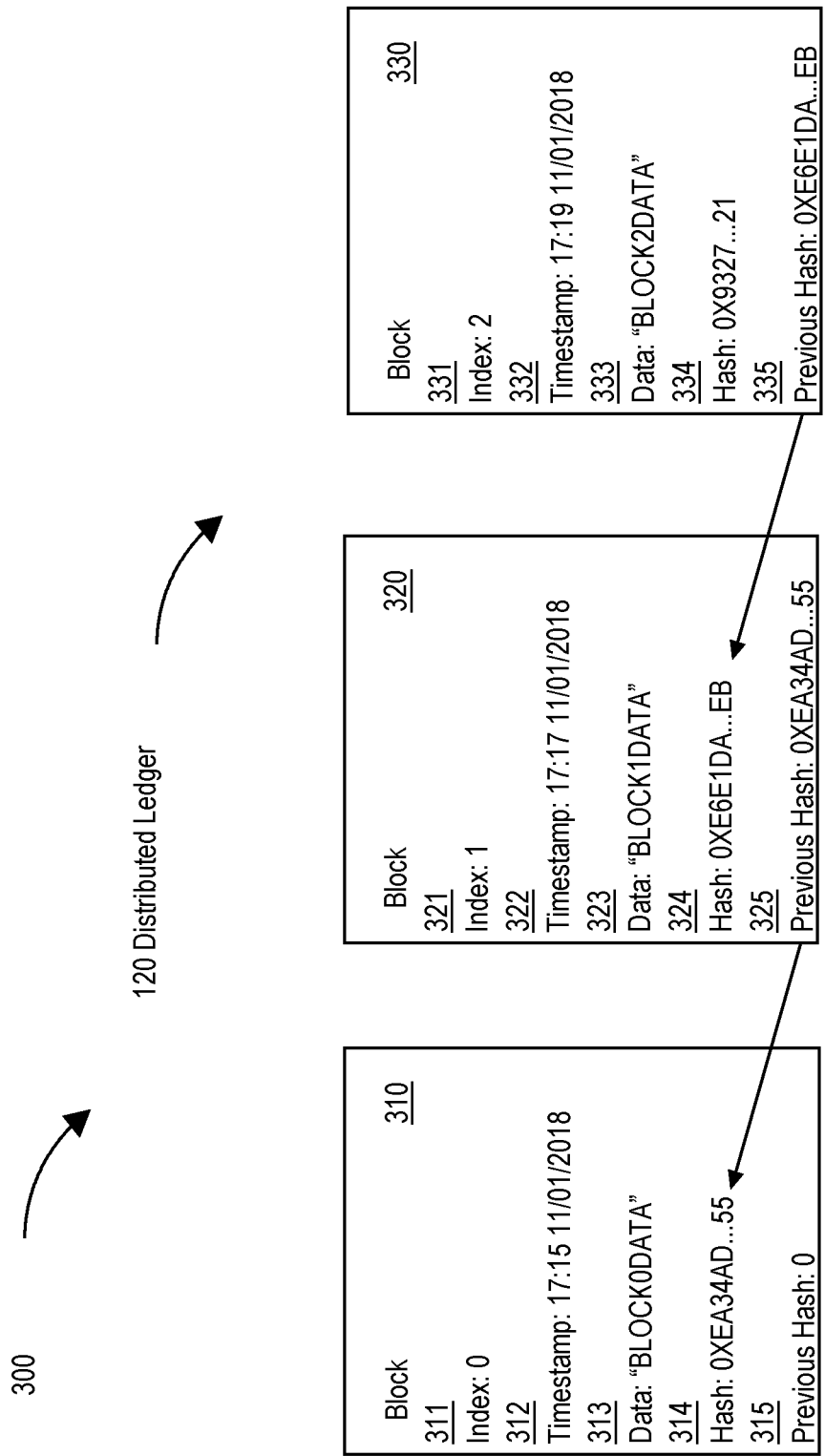
FIG. 3 illustrates an example distributed data repository in accordance with some embodiments.

FIG. 3 illustrates an example digital distributed data repository 300 in accordance with some embodiments. In an example embodiment, a digital distributed data repository 300 comprises the distributed ledger 120 having blocks 310, 320, 330. The distributed ledger 120 may include any number of blocks. In the example of FIG. 3, each block 310, 320, 330 may include its own index number 311, 321, 331, timestamp 312, 322, 332, data 313, 323, 333, hash 314, 324, 334, and previous hash 315, 325, 335.

The index number 311, 321, 331 may be a numerical index that indicates the block's placement in the chain. The timestamp 312, 322, 332 may be the date and time of when a block 310, 320, 330 is created. The data 313, 323, 333 may be an encrypted share stored as "block0data," "block1data," and "block2data" in the blocks 310, 320, 330, respectively. The hash 314, 324, 334 may be a hash of the encrypted rule or policy, such as an MD5 hash, SHA256 hash, or RIPEMD hash. The previous hash 315, 325, 335 may be the hash of the previous block, which links the blocks in sequence. In the example of FIG. 3, block 330 stores a record of previous hash 324, while block 320 stores a record of previous hash 314. These records of previous hashes link each new block to the previous block to form a chain that allows for integrity checks of each block.

3.3 Identity-Based Firewall

Figure 4:
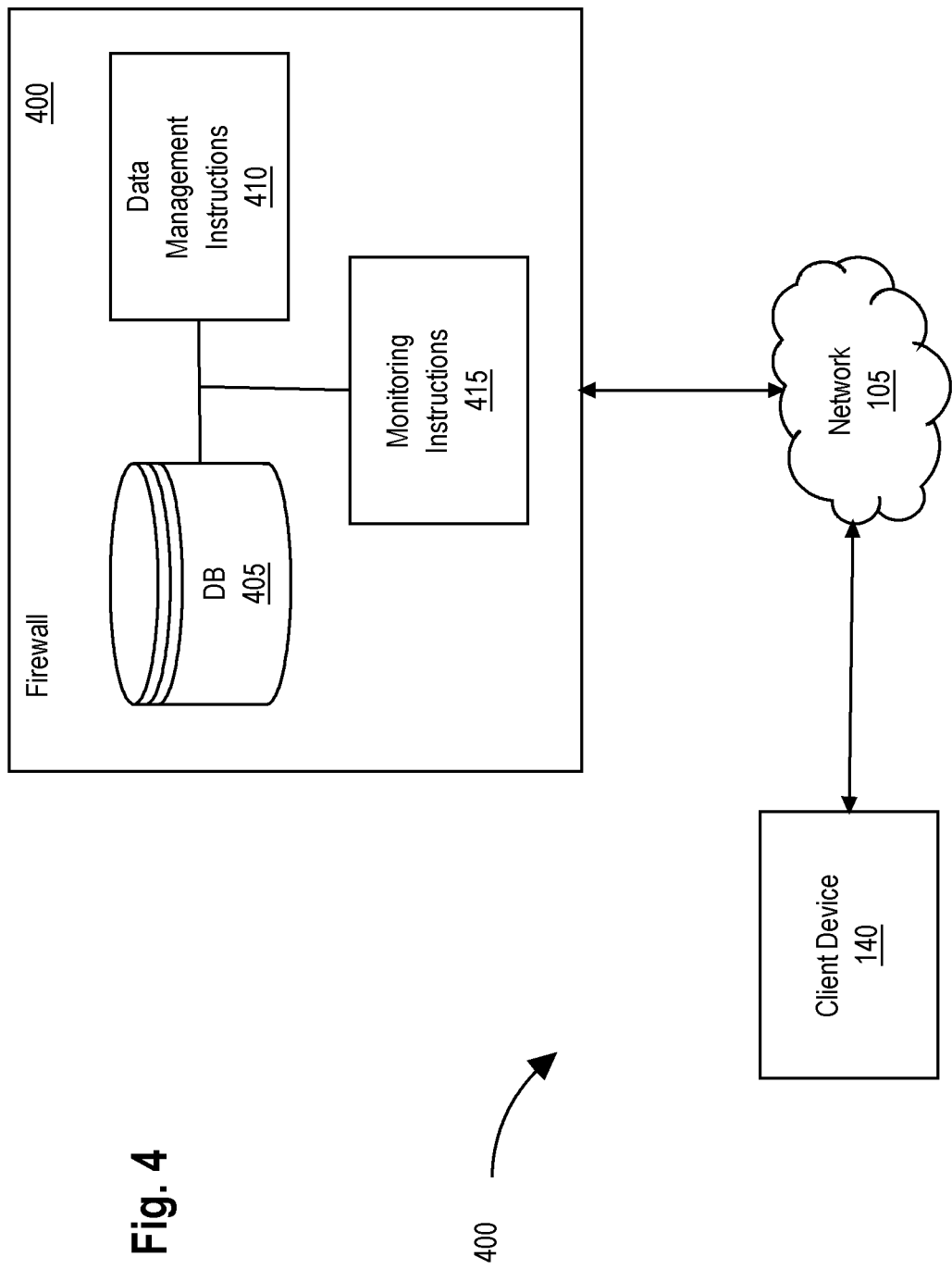
FIG. 4 illustrates an example identity-based firewall in accordance with some embodiments.

FIG. 4 illustrates an example identity-based firewall 400 in accordance with some embodiments. In some embodiments, the identity-based firewall 130 of FIG. 1 is similarly configured as the identity-based firewall 400.

The identity-based firewall 400, optionally, may have a database 405 that stores its corresponding identity awareness data that is stored in the broker databases 205 in brokers 200 associated with the same federation and/or the distributed ledger 120. In some embodiments, data management instructions 410 may periodically check the distributed ledger 120 for data directly rather than using a local database for storage. Alternatively, the data management instructions 410 may periodically check the distributed ledger 120 for updated data and store the updated data in the local database 405. Alternatively, or in addition to, the local database 405 may be automatically updated by the distributed ledger 120 when changes occur. In some embodiments, the identity awareness data, and any changes to them, may be hashed and encrypted and stored in the distributed ledger 120 by the identity-based firewall 400. The identity-based firewall 400 uses the identity awareness data to configure its firewall rules. Monitoring instructions 415 monitors network traffic and uses the firewall rules to control traffic from users, applications, and/or client devices based on their identities.

In an embodiment, rather than the identity-based firewall 400 querying data in the distributed ledger 120, a gateway may query data in the distributed ledger 120 and to manage the identity-based firewall 400 using the identity awareness data. In an embodiment, the gateway may be configured as the identity-based firewall 400 and may thus enforce access, including but not limited to network access and application specification devices access, based on the identity awareness data form the distributed ledger 120.

The identity awareness data may be distributed across all sites for the enterprise and may take effect across all of its distributed identity-based firewalls, removing the necessity to separately provide identity information at each identity-based firewall and creating a frictionless experience. For example, each of the identity-based firewall for the enterprise accesses the identity awareness data stored in the distributed ledger 120. A technical benefit of this approach is that a newly deployed identity-based firewall may start providing network access control services without depending on a directory agent. Another technical benefit of this approach is that any change to the identity awareness data takes effect across all of the distributed identity-based firewalls.

Once a client device 140 is allowed network access based on user identity, the client device 140 can access internal network within the enterprise 125, such as enterprise device 135. It will be appreciated that other enterprises may be similarly configured as the enterprise 125, such as including an identity-based firewall that is able to retrieve its identity awareness data from the distributed ledger 120 or from a different distributed ledger.

4.0 Procedural Overview

Figure 5:
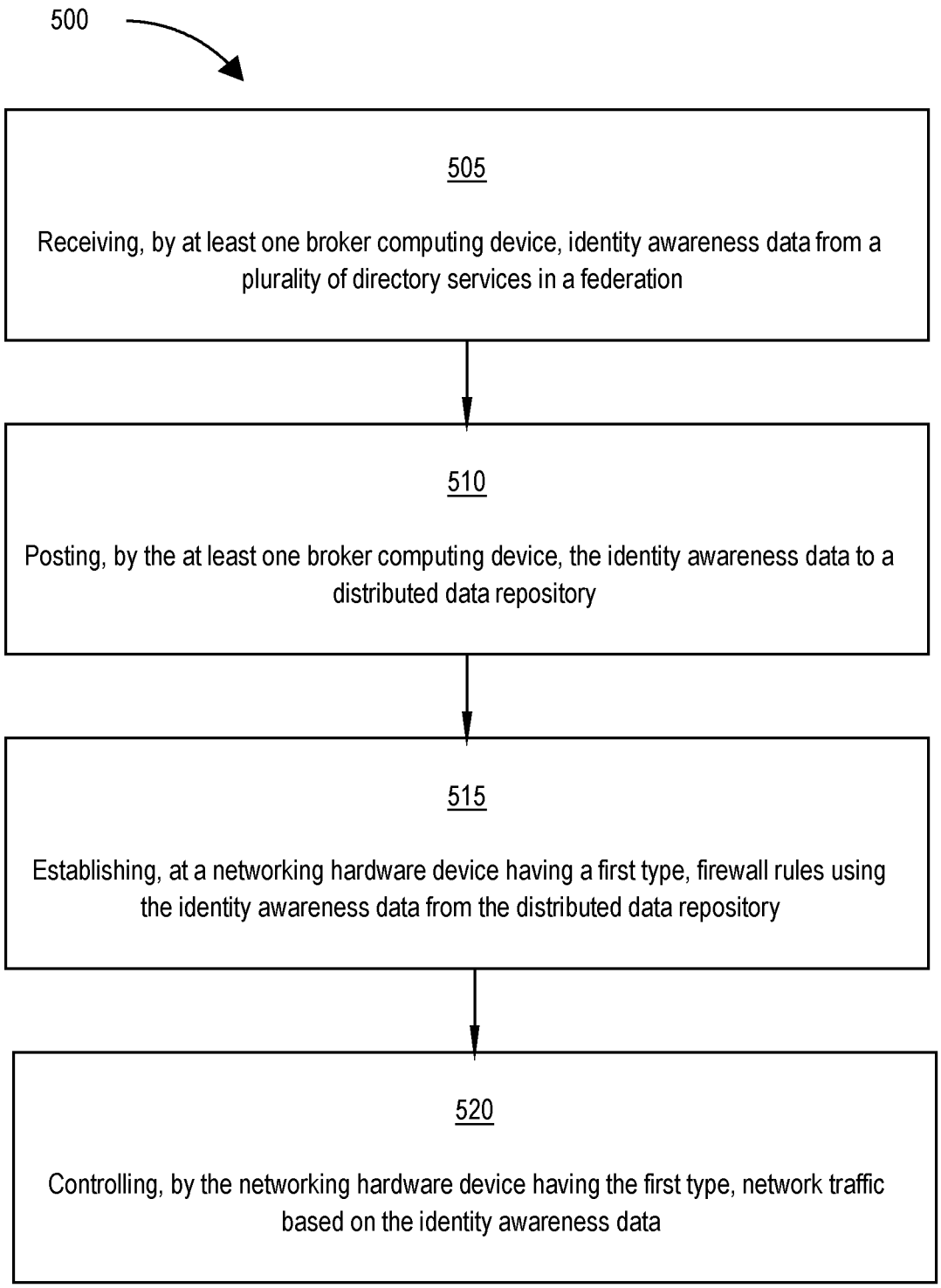
FIG. 5 illustrates an example method for providing access control services in accordance with some embodiments.

FIG. 5 illustrates an example method 500 for providing access control services in accordance with some embodiments. FIG. 5 may be used as a basis to code the method 500 as one or more computer programs or other software elements that the brokers 110 and/or the identity-based firewalls 125 execute or host. For ease of discussion, the method 500 is described with reference to a single federation and a single enterprise. However, it will be appreciated that the method 500 can be performed for multiple federations and/or multiple enterprises.

The method 500 begins at step 505, where at least one broker computing device receives identity awareness data from a plurality of directory services in a federation. In some embodiments, each of the at least one broker computing device is a dedicated broker to one of the plurality of directory services in the federation for receiving therefrom identity awareness data stored by that directory service. In some embodiments, the identity awareness data includes identities of users, applications, and/or client device and their corresponding access policies. By receiving data from each and every one of the plurality of directory services in the federation, the at least one broker computing device centrally manages all identity awareness data associated with the federation.

At step 510, the at least one broker computing device posts the identity awareness data to a distributed data repository. In some embodiments, the at least one broker computing device generates a hash and encrypts the identity awareness data before posting the identity awareness data to the distributed data repository.

At step 515, firewall rules at a networking hardware device having a first type are established using the identity awareness data from the distributed data repository.

In an embodiment, prior to step 515, the networking hardware device having the first type accesses and queries the distributed data repository and receives the identity awareness data from the distributed data repository. The networking hardware device having the first type may be an identity-based firewall, which may be one of many distributed identity-based firewalls within the enterprise.

In another embodiment, prior to step 515, a networking hardware device having a second type accesses and queries the distributed data repository, receives the identity awareness data from the distributed data repository, and uses the identity awareness data from the distributed data repository to manage the networking hardware device having the first type. The networking hardware device having the second type may be a gateway. The networking hardware device having the first type may be separate and distinct from the networking hardware device having the second type. Alternatively, the networking hardware device having the first type and the networking hardware device having the second type are the same device.

At step 520, the networking hardware device having the first type controls network traffic based on the identity awareness data.

In an embodiment, the identity awareness data is distributed to a plurality of distributed networking hardware devices having the first type such that the plurality of distributed networking hardware devices having the first type is synchronized with the identity awareness data. The identity awareness data is automatically applied to the plurality of networking hardware devices having the first type to control network traffic from users, applications, and client devices based on the identity awareness data. The identity awareness data allows the control to be based on their identities.

Using the foregoing techniques, programmed computers may centrally manage identity awareness data associated with a federation and distribute the identity awareness data across a plurality of identity-based firewalls. The present approach utilizes a dedicated broker for each directory service in the federation to receive therefrom identity awareness data and, together with other dedicated brokers associated with the federation, send all of the received identity awareness data to a distributed data repository. Subsequently, the distributed identity-based firewalls or a gateway retrieve the identity awareness data from the distributed data repository, instead of from various directory agents directly. The identity awareness data automatically takes effect on each of the distributed identity-based firewalls to control traffic from users. Implementations provide for a centrally managing authority of data, eliminate challenges of maintaining synchronization across distributed identity-based firewalls, and remove the necessity of different directory agents, shifting processing burden away from the identity-based firewalls trying to establish communication with the different directory agents. The scalable and distributed nature of a distributed data repository allows user identities and access policies across complex federations involving multiple overlapping enterprises to be configured or updated across numerous identity-based firewalls, without individually configuring each identity-based firewall by an administrator.

Furthermore, the approaches disclosed herein improve data security and data integrity. The use of a distributed data repository protects the integrity of any data stored in the distributed data repository. The nature of the distributed data repository also ensures that each new block of data is linked to the previous block, creating an improved method of documenting changes and rejecting unapproved changes. Consequently, the distributed data repository functions as a secure backup for sensitive awareness data with high Byzantine fault tolerance.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
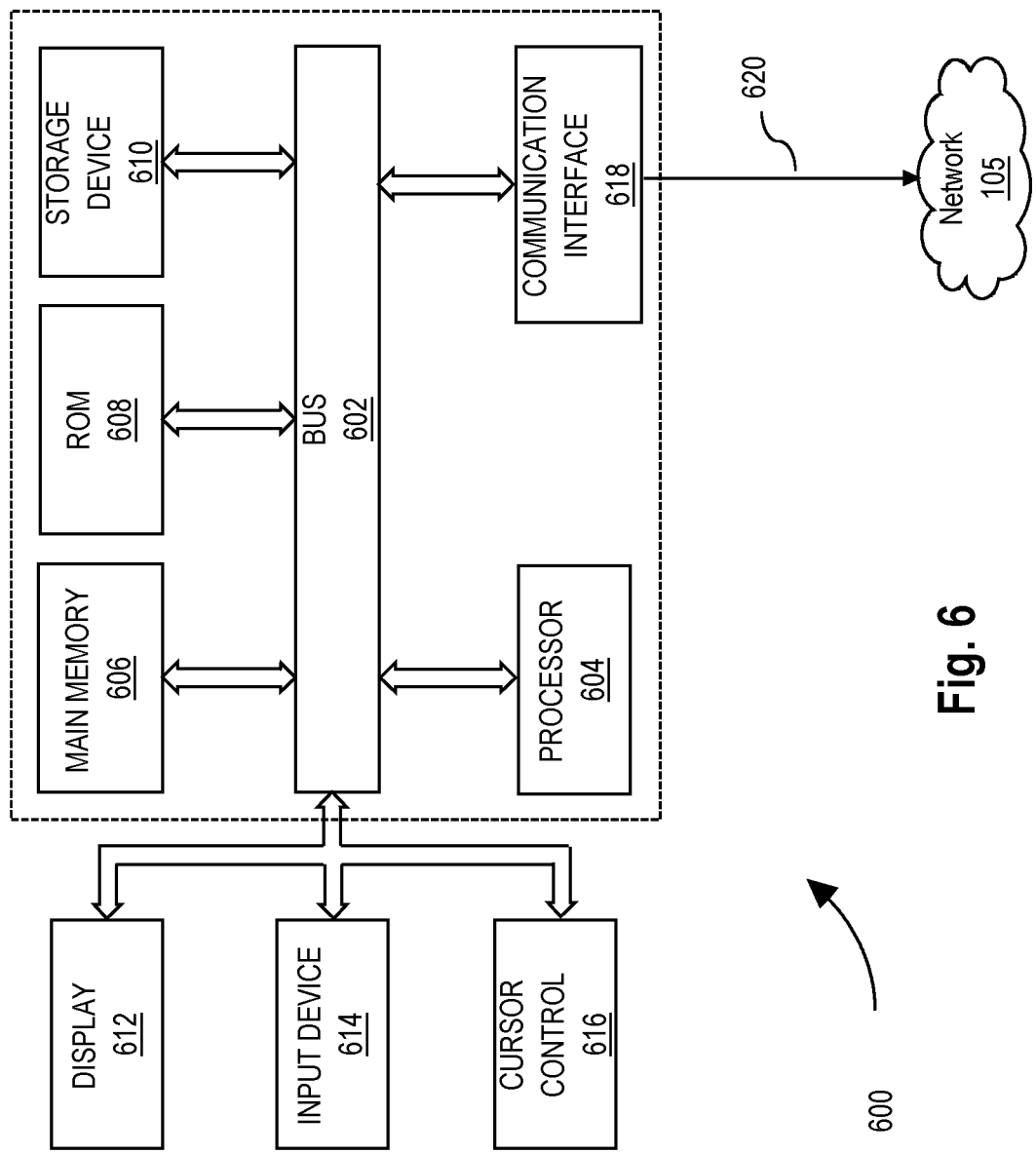
FIG. 6 illustrates an example block diagram of a computer system upon which an embodiment of the invention may be implemented.

FIG. 6 illustrates an example block diagram of a computer system 600 upon which an embodiment of the invention may be implemented. Computer system 600 includes a bus 602 or other communication mechanism for communicating information, and a hardware processor 604 coupled with the bus 602 for processing information. The hardware processor 604 may be, for example, a general-purpose microprocessor.

The computer system 600 also includes a main memory 606, such as a random-access memory (RAM) or other dynamic storage device, coupled to the bus 602 for storing information and instructions to be executed by the processor 604. The main memory 606 also may be used for storing temporary variables or other intermediate information during execution of instructions to be executed by the processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a cathode ray tube (CRT), a liquid crystal display (LCD), or any other display for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (for example, x) and a second axis (for example, y), that allows the device to specify positions in a plane.

The computer system 600 may implement the techniques described herein using customized hard-wired logic, one or more ASICs or FPGAs, firmware and/or program logic which in combination with the computer system causes or programs the computer system 600 to be a special-purpose machine. According to one embodiment, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device 610. Volatile media includes dynamic memory, such as the main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid state drive of a remote computer. The remote computer can load the instructions into its dynamic memory and send the instructions over a telephone line using a modem. A modem local to the computer system 600 can receive the data on the telephone line and use an infra-red transmitter to convert the data to an infra-red signal. An infra-red detector can receive the data carried in the infra-red signal and appropriate circuitry can place the data on the bus 602. The bus 602 carries the data to the main memory 606, from which processor 604 retrieves and executes the instructions. The instructions received by the main memory 606 may optionally be stored on the storage device 610 either before or after execution by the processor 604.

The computer system 600 also includes a communication interface 618 coupled to the bus 602. The communication interface 618 provides a two-way data communication coupling to a network link 620 that is connected to a network, such as the network 105 of FIG. 1. For example, the communication interface 618 may be an integrated services digital network (ISDN) card, cable modem, satellite modem, or a modem to provide a data communication connection to a corresponding type of telephone line. As another example, the communication interface 618 may be a local area network (LAN) card to provide a data communication connection to a compatible LAN. Wireless links may also be implemented. In any such implementation, the communication interface 618 sends and receives electrical, electromagnetic or optical signals that carry digital data streams representing various types of information.

The network link 620 typically provides data communication through one or more networks 105 to other computing systems. The computer system 600 can send messages and receive data, including transaction data, through the network 105, the network link 620 and the communication interface 618.

6.0 Other Aspects of Disclosure

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
receiving, by at least one broker computing device, identity awareness data from a plurality of directory services in a federation;
posting, by the at least one broker computing device, the identity awareness data to a distributed data repository;
establishing, at a networking hardware device having a first type, firewall rules using the identity awareness data from the distributed data repository;
controlling, by the networking hardware device having the first type, network traffic based on the identity awareness data.

2. The method of claim 1, further comprising, prior to applying the identity awareness data, receiving, by the networking hardware device having the first type, the identity awareness data from the distributed data repository.

3. The method of claim 1, further comprising, prior to applying the identity awareness data receiving, by a networking hardware device having a second type, the identity awareness data from the distributed data repository.

4. The method of claim 1, further comprising distributing the identity awareness data in the distributed data repository to a plurality of distributed networking hardware devices having the first type such that the plurality of distributed networking hardware devices having the first type is synchronized with the identity awareness data in the distributed data repository.

5. The method of claim 1, wherein the networking hardware device having the first type is an identity-based firewall.

6. The method of claim 1, wherein the identity awareness data includes identities of users, applications and client devices and their corresponding access control policies.

7. The method of claim 6, wherein the identities of users include user names, user group names, or both that are mapped to identities of client devices that are in communication with the networking hardware device having the first type.

8. One or more non-transitory computer-readable storage media storing one or more sequences of program instructions which, when executed by one or more computing devices, cause performing:
receiving, by at least one broker computing device, identity awareness data from a plurality of directory services in a federation;
posting, by the at least one broker computing device, the identity awareness data to a distributed data repository;
establishing, at a networking hardware device having a first type, firewall rules using the identity awareness data from the distributed data repository;
controlling, by the networking hardware device having the first type, network traffic based on the identity awareness data.

9. The one or more non-transitory computer-readable storage media of claim 8, further comprising instructions that, when executed by the one or more computing devices, cause prior to applying the identity awareness data, receiving, by the networking hardware device having the first type, the identity awareness data from the distributed data repository.

10. The one or more non-transitory computer-readable storage media of claim 8, further comprising instructions that, when executed by the one or more computing devices, cause prior to applying the identity awareness data, receiving, by a networking hardware device having a second type, the identity awareness data from the distributed data repository.

11. The one or more non-transitory computer-readable storage media of claim 8, further comprising instructions that, when executed by the one or more computing devices, cause distributing the identity awareness data in the distributed data repository to a plurality of distributed networking hardware devices having the first type such that the plurality of distributed networking hardware devices having the first type is synchronized with the identity awareness data in the distributed data repository.

12. The one or more non-transitory computer-readable storage media of claim 8, wherein the networking hardware device of the first type is an identity-based firewall.

13. The one or more non-transitory computer-readable storage media of claim 8, wherein the identity awareness data includes identities of users, applications and devices and their corresponding access control policies.

14. The one or more non-transitory computer-readable storage media of claim 13, wherein the identities of users include user names, user group names, or both that are mapped to identities of client devices that are in communication with the networking hardware device having the first type.

15. A computer system comprising:
a distributed data repository;
at least one broker computing device communicatively coupled with the distributed data repository and a plurality of directory services in a federation, wherein the at least one broker computing device comprises a first non-transitory data storage medium storing a first set of instructions which, when executed by the at least one broker computing device, cause:
receiving identity awareness data from the plurality of directory services;
posts the identity awareness data received from the plurality of directory services to the distributed data repository;
a networking hardware device having a first type, communicatively coupled with the distributed data repository, wherein the networking hardware device having the first type comprises a second non-transitory data storage medium storing a second set of instructions which, when executed by the networking hardware device, cause:
establishing firewall rules using the identity awareness data from the distributed data repository;
controlling network traffic based on the identity awareness data.

16. The computer system of claim 15, wherein the second non-transitory data storage medium storing the second set of instructions which, when executed by the networking hardware device having the first type, further cause, prior to applying the identity awareness data, receiving the identity awareness data from the distributed data repository.

17. The computer system of claim 15, wherein the networking hardware device having the first type is an identity-based firewall.

18. The computer system of claim 15, wherein the posted identity awareness data includes identities of users, applications and devices and their corresponding access control policies.

19. The computer system of claim 18, wherein the identities of users include user names, user group names, or both that are mapped to identities of client devices that are in communication with the networking hardware device having the first type.

20. The computer system of claim 15, further comprising a plurality of distributed networking hardware devices having the first type, wherein the plurality of distributed networking hardware devices having the first type is synchronized with the identity awareness data in the distributed data repository.

* * * * *